(12) United States Patent
Handrosch et al.

(10) Patent No.: US 7,799,126 B2
(45) Date of Patent: Sep. 21, 2010

(54) PIGMENT

(75) Inventors: Carsten Handrosch, Muehltal (DE); Carsten Lorenz, Gross-Rohrheim (DE)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 0 days.

(21) Appl. No.: 11/785,917

(22) Filed: Apr. 20, 2007

(65) Prior Publication Data

US 2007/0251424 A1 Nov. 1, 2007

(30) Foreign Application Priority Data

Apr. 21, 2006 (EP) ................... 06008237

(51) Int. Cl.
- *C04B 14/04* (2006.01)
- *C09C 1/44* (2006.01)
- *C09C 1/00* (2006.01)
- *B32B 19/00* (2006.01)
- *B32B 5/16* (2006.01)
- *B05D 7/00* (2006.01)

(52) U.S. Cl. ................ 106/482; 106/415; 106/472; 106/474; 428/357; 428/403; 427/212; 427/218

(58) Field of Classification Search ........... 428/403, 428/357; 106/472, 482, 474, 416, 486, 415, 106/468; 427/212, 218, 372.2

See application file for complete search history.

(56) References Cited

U.S. PATENT DOCUMENTS

| 4,568,609 | A  | * | 2/1986 | Sato et al. ................... 428/403 |
| 6,436,538 | B1 | * | 8/2002 | Takahashi et al. ............ 523/160 |
| 6,517,628 | B1 | * | 2/2003 | Pfaff et al. .................. 106/415 |
| 6,596,070 | B1 | * | 7/2003 | Schmidt et al. ............. 106/417 |
| 6,837,925 | B2 |   | 1/2005 | Kubo et al. |
| 2005/0176850 | A1 | * | 8/2005 | Schmidt et al. ............. 428/403 |
| 2006/0225609 | A1 | * | 10/2006 | Rueger et al. .............. 106/31.9 |

FOREIGN PATENT DOCUMENTS

| EP | 1 481 658 A1 | | 12/2004 |
| WO | WO 2004/035693 | * | 4/2004 |
| WO | WO 2004/055119 | * | 7/2004 |

* cited by examiner

Primary Examiner—Anthony J Green
Assistant Examiner—Pegah Parvini
(74) Attorney, Agent, or Firm—Millen, White, Zelano & Branigan, P.C.

(57) ABSTRACT

Disclosed are a pigment comprising a flake-form substrate, where natural and synthetic clay minerals are excluded as substrate, and an anion-binding layer, in particular comprising a layered double hydroxide, where the anion-binding layer comprises anion-forming organic, inorganic and/or organometallic colorants; and a process for the preparation of said pigment and to the use thereof in cosmetics, paints, coatings, plastics, films, in security printing, in security features in documents and identity cards, for coloring seed, for coloring foods or in medicament coatings, and for the preparation of pigment compositions and dry preparations.

22 Claims, No Drawings

PIGMENT

The present invention relates to a pigment comprising a flake-form substrate, where natural and synthetic clay minerals are excluded as substrate, and an anion-binding layer, in particular comprising a layered double hydroxide, where the anion-binding layer comprises anion-forming organic, inorganic and/or organometallic colorants. The present invention furthermore relates to a process for the preparation of the pigment according to the invention and to the use thereof in cosmetics, paints, coatings, plastics, films, in security printing, in security features in documents and identity cards, for coloring seed, for coloring foods or in medicament coatings and for the preparation of pigment compositions and dry preparations.

The use of lustre or effect pigments having interference phenomena is widespread. Pigments of this type have become indispensable in automobile paints, decorative coatings of all types and in the coloring of plastics, in paints and printing inks, in particular inks for security printing, and in applications in decorative cosmetics. In the matrix surrounding them, these pigments ideally align parallel to the surface of the coating and exhibit their optical action through a complex interplay of interference, reflection and absorption of the incident light. A bright coloration, change between different colours depending on the viewing angle, so-called colour flops, or changing brightness impressions are the focus of interest for the various applications.

However, conventional effect pigments frequently exhibit only low colour saturation and a limited colour spectrum. In order to expand the colour spectrum, it has been proposed in EP 1 481 658 to coat natural phyllosilicates, such as, for example, mica, with a hydrotalcite-like layer of a double hydroxide containing dye anions. However, the pigments mentioned in the prior art have the disadvantage that the colours are frequently not pure and are not sufficiently strong. However, these are important conditions for being able to achieve optimum coloring results in the individual applications.

An object of the present invention is therefore to provide a pigment which is distinguished by particular coloring power and strength and by particularly pure colours. A further object is to provide a pigment which may additionally also have high hiding power.

Surprisingly, the above-mentioned object is achieved by a pigment of the present invention.

Accordingly, the present invention relates firstly to a pigment comprising a flake-form substrate, where natural and synthetic clay minerals are excluded as substrate, and an anion-binding layer which comprises organic, inorganic and/or organometallic colorants. In particular, the flake-form substrate is selected from glass flakes, $SiO_2$ flakes, $Al_2O_3$ flakes, synthetic or natural flake-form iron oxide, synthetic or natural graphite and/or flake-form metals. The anion-binding layer likewise preferably comprises a layered double hydroxide.

Besides the attractive combination of interference and absorption colour, a pigment based on the substrates preferably selected in accordance with the invention exhibits particularly high colour purity with respect to the interference colour of the substrate and the absorption colour of the organic, inorganic and/or organometallic colorant. If, for example, the substrate displays an interference colour, this may be superposed by the absorption colour of the organic, inorganic and/or organometallic colorant, giving a hybrid pigment, i.e. a pigment is obtained which has at least two different colour effects based on different physical laws.

In addition, the pigment according to the invention based on glass flakes additionally exhibits higher lustre than a pigment based on natural phyllosilicates. Furthermore, a pigment of this type exhibits a glitter effect, which can only be achieved with difficulty, or not at all, in this way with conventional pigments. In the case of flake-form metals, intensely coloured pigments are obtained which additionally have high hiding power. This specific combination of high hiding power and high colour strength and purity cannot be achieved with metal pigments from the prior art. Due to the fixing of the colorant anion by intercalation into the positively charged interlayers of the double hydroxide preferably employed, an increase in the stability is achieved compared with simple adsorptive binding. This is evident from a significantly higher stability to bleeding, i.e. significantly reduced liberation of the colorant. In addition, the pigment according to the invention exhibits significantly better dispersion behaviour compared with the pure colorant ion or a simple physical mixture of interference pigment and colorant salt.

Owing to the advantageous properties, the pigment according to the invention is universally suitable for a large number of applications of very different types. The present invention accordingly also relates to the use of this pigment in cosmetics, paints, coatings, plastics, films, in security printing, in security features in documents and identity cards, for coloring seed, for coloring foods or in medicament coatings and for the preparation of pigment compositions and dry preparations.

A pigment according to the invention is based, in particular, on a flake-form substrate selected from glass flakes, $SiO_2$ flakes, $Al_2O_3$ flakes, synthetic or natural flake-form iron oxide, synthetic or natural graphite and/or flake-form metals. Suitable metal flakes may consist, inter alia, of aluminium, titanium, bronze, steel or silver, preferably of aluminium and/or titanium. The metal flakes may have been passivated by appropriate treatment.

The flake-form substrate is preferably a glass flake, $SiO_2$ flake or $Al_2O_3$ flake and, owing to its particularly smooth surface and very high reflection capacity, very particularly preferably a glass flake.

The $SiO_2$ flakes preferably employed are synthetic $SiO_2$ flakes which have a uniform layer thickness and are preferably produced in accordance with International Application WO 93108237 on a continuous belt by solidification and hydrolysis of a water-glass solution. A uniform layer thickness here is taken to mean a layer-thickness tolerance of 3 to 10%, preferably 3 to 5% of the total dry layer thickness of the particles. The flake-form silicon dioxide particles are generally in amorphous form. Synthetic flakes of this type have the advantage over natural materials, such as, for example, mica, that the layer thickness can be set with respect to the desired effects and the layer-thickness tolerance is limited.

The very particularly preferred glass flakes can consist of all glass types known to the person skilled in the art, in particular Ca-Al-borosilicate glasses, such as, for example, window glass, C glass, E glass, ECR glass, Duran® glass, laboratory equipment glass or optical glass. Particular preference is given to E glass or ECR glass. The refractive index of the glass flakes is preferably 1.45-1.80, in particular 1.50-1.70. Furthermore, glass flakes comprising doped glass are suitable as preferred substrates. Suitable dopants are, for example, Fe, Bi, La, Nb, Ba, Ti, V, Ce, Au and Cu or mixtures thereof. Through the doping, it is possible to employ glasses having specific properties, such as, for example, a high refractive index of up to 2.3 or a strong inherent colour.

Suitable substrates are accordingly flake-form substrates based on Ca—Al-borosilicate (for example RONASTAR® from Merck KGaA), SiO$_2$ (for example COLORSTREAM® from Merck KGaA), Al$_2$O$_3$ (for example XIRALLIC® from Merck KGaA), natural leaf-form iron oxide (for example MIOX® from Kärntner Montan Industrie), graphite, synthetic flake-form iron oxide (for example TAROX® from Titan Kogyo), or metallic aluminium.

The size of the base substrate is not crucial per se and can be matched to the respective application. The diameter of the flake-form substrate is usually between 1 and 500 µm, preferably between 5 and 200 µm and in particular 10-150 µm. Preferred smaller particle sizes are furthermore those in the range 1-100 µm, in particular 5-60 µm and 1-165 µm. Its thickness is between 0.1 and 5 µm and preferably 0.1 to 1 µm. The average aspect ratio of the flake-form substrate, i.e. the ratio of the average length measurement value, which corresponds to the average diameter here, to the average thickness measurement value, is usually 5 to 200, preferably 20 to 150 and particularly preferably 30 to 120.

The substrate may have been doped with ions or elements which result in a coloration of the substrate. In addition, the substrate may also have been doped with ions or elements which, in addition to/besides the colour, effect a certain physical property of the substrate, for example an increased refractive index, conductivity, fluorescence, phosphorescence, magnetism, NLO properties, IR reflection, etc. The physical properties mentioned which are induced by ion or element doping are only intended to explain the present invention without limiting it.

In a further embodiment of the present invention, one or more transparent, semitransparent and/or opaque layers of metal oxides, metal oxide hydrates, metal suboxides, metals, metal fluorides, metal nitrides, metal oxynitrides or mixtures of these materials can have been applied to the flake-form substrate and beneath the anion-binding layer or on top of the anion-binding layer. The metal oxide, metal oxide hydrate, metal suboxide, metal, metal fluoride, metal nitride or metal oxynitride layers or the mixtures thereof may be of low refractive index (refractive index<1.8) or high refractive index (refractive index≧1.8). Suitable metal oxides and metal oxide hydrates are all metal oxides or metal oxide hydrates known to the person skilled in the art, such as, for example, aluminium oxide, aluminium oxide hydrate, silicon oxide, silicon oxide hydrate, iron oxide, iron oxide hydrate, tin oxide, cerium oxide, zinc oxide, zirconium oxide, chromium oxide, titanium oxide, in particular titanium dioxide, titanium oxide hydrate and mixtures thereof such as, for example, ilmenite or pseudobrookite. Metal suboxides which can be employed are, for example, the titanium suboxides. Suitable metals are, for example, chromium, aluminium, nickel, silver, gold, titanium, copper or alloys, and a suitable metal fluoride is, for example, magnesium fluoride. Metal nitrides or metal oxynitrides which can be employed are, for example, the nitrides or oxynitrides of the metals titanium, zirconium and/or tantalum. Metal oxide, metal, metal fluoride and/or metal oxide hydrate layers and very particularly preferably metal oxide and/or metal oxide hydrate layers are preferably applied to the support. Furthermore, multilayered structures comprising high- and low-refractive-index metal oxide, metal oxide hydrate, metal or metal fluoride layers may also be present, where high- and low-refractive-index layers preferably alternate. Particular preference is given to layer packages comprising a high-refractive-index layer and a low-refractive-index layer, where one or more of these layer packages may be applied to the support. The sequence of the high- and low-refractive-index layers here can be matched to the substrate in order to incorporate the substrate into the multilayered structure. In a further embodiment, the metal oxide, metal oxide hydrate, metal suboxide, metal, metal fluoride, metal nitride or metal oxynitride layers may have been treated or doped with colorants or other elements. Suitable colorants or other elements are, for example, organic or inorganic coloured pigments, such as coloured metal oxides, for example magnetite, chromium oxide or coloured pigments, such as, for example, Berlin Blue, ultramarine, bismuth vanadate, Thénard's Blue, or alternative organic coloured pigments, such as, for example, indigo, azo pigments, phthalocyanines or Carmine Red, or elements such as, for example, yttrium or antimony, but also coloured heteropolyanions. In a preferred embodiment, the outer layer on the substrate is a high-refractive-index metal oxide. This outer layer may additionally be on the above-mentioned layer packages or, in the case of high-refractive-index supports, be part of a layer package and consist, for example, of TiO$_2$, titanium suboxides, Fe$_2$O$_3$, SnO$_2$, ZnO, ZrO$_2$, Ce$_2$O$_3$, CoO, Co$_3$O$_4$, V$_2$O$_5$, Cr$_2$O$_3$ and/or mixtures thereof, such as, for example, ilmenite or pseudobrookite. TiO$_2$ is particularly preferred. The said coated substrates exhibit one or more angle-dependent interference colours. Particularly intense colour impressions are achieved if the interference colour of the substrate corresponds to the absorptive colour of the colorant. If the interference colour of the substrate differs from the absorptive colour of the colorant, attractive multicolour effects are achieved.

The thickness of the metal oxide, metal oxide hydrate, metal suboxide, metal, metal fluoride, metal nitride or metal oxynitride layers or a mixture thereof is usually 3 to 300 nm and in the case of the metal oxide, metal oxide hydrate, metal suboxide, metal fluoride, metal nitride or metal oxynitride layers or a mixture thereof preferably 20 to 200 nm. The thickness of the metal layers is preferably 4 to 50 nm.

In the case of glass flakes as flake-form substrate, these are very particularly preferably coated with an SiO$_2$ layer. The SiO$_2$ covering protects the glass surface against chemical modification, such as swelling, leaching-out of glass constituents or dissolution in the aggressive acidic coating solutions. During the calcination process in the production of these substrates, intimate bonding of the chemically related materials occurs in the case of glass flakes at the interface between glass body and precipitated SiO$_2$. Owing to the high softening temperature, the precipitated SiO$_2$ sheath gives the substrates the requisite mechanical stability, even during calcination above 700° C. The adhesion of the coating(s) following the SiO$_2$ layers to the substrate is also improved. The thickness of the SiO$_2$ layer on the glass flakes can be varied in broad ranges depending on the desired effect. The layer has thicknesses of 5-350 nm, preferably 5-150 nm. Layer thicknesses of 30-100 nm are preferred for the control of lustre and colour strength. The SiO$_2$ layer may also be doped with carbon-black particles, coloured heteropolyanions, inorganic coloured pigments and/or metal particles if this doping is stable in air or under inert gas up to calcination temperatures of 700-800° C. The proportion of dopant in the SiO$_2$ matrix is then 1-30% by weight, preferably 2-20% by weight, in particular 5-20% by weight. In a particularly preferred embodiment, a layer of a high-refractive-index metal oxide, in particular a TiO$_2$ layer, is applied to the SiO$_2$ layer.

In accordance with the present invention, the above-mentioned substrate, which may be coated or uncoated, is coated with an anion-binding layer, in particular comprising a layered double hydroxide. Preferred layers of this type are also known as layered double hydroxide layers (LDH layers).

The layered double hydroxide (LDH) preferably comprises a double hydroxide of the general formula $$M^{2+}_{1-x}M^{3+}_{x}(OH)_2(Z^{n-})_{x/n} \cdot mH_2O$$

where $0.2 < x < 0.33$, where
$M^{3+}$ is selected from $Al^{3+}$, $Cr^{3+}$, $Fe^{3+}$, $Ga^{3+}$, $In^{3+}$, $Y^{3+}$, $La^{3+}$ /or $Ce^{3+}$ and
$M^{2+}$ is selected from $Ba^{2+}$, $Ca^{2+}$, $Cu^{2+}$, $Mg^{2+}$, $Sr^{2+}$ and/or $Zn^{2+}$,
$Z^{n-}$ denotes a counterion of the metal salts and/or an anion or anion mixture of the anion-forming organic and/or inorganic colorants, where n stands for the charge number of the anion.
m is a stoichiometric factor and indicates the content of water of crystallization in the LDH. For the purposes of the present invention, m can be, for example, 1-12, but in addition also other values, which may be integer or non-integer.

Examples of the said double hydroxides are $Mg_{0.67}Al_{0.33}(OH)_2(Z^{n-})_{0.33/n} \cdot mH_2O$ and $Mg_{0.67}Fe_{0.33}(OH)_2(Z^{n-})_{0.33} \cdot mH_2O$, $Zn_{0.67}Al_{0.33}(OH)_2(Z^{n-})_{0.33/n} \cdot mH_2O$ and $Zn_{0.67}Fe_{0.33}(OH)_2(Z^{n-})_{0.33} \cdot mH_2O$, $Ca_{0.67}Al_{0.33}(OH)_2(Z^{n-})_{0.33/n} \cdot mH_2O$ and $Ca_{0.67}Fe_{0.33}(OH)_2(Z^{n-})_{0.33} \cdot mH_2O$. In particular, $Mg_{0.67}Fe_{0.33}(OH)_2(Z^{n-})_{0.33/n} \cdot mH_2O$, $Ca_{0.67}Al_{0.33}(OH)_2(Z^{n-})_{0.33/n}$, $Zn_{0.67}Fe_{0.33}(OH)_2(Z^{n-})_{0.33/n} \cdot mH_2O$ and $Ca_{0.67}Fe_{0.33}(OH)_2(Z^{n-})_{0.33/n} \cdot mH_2O$ have proven particularly advantageous.

Preferably, $M^{3+}=Al^{3+}$ or $Fe^{3+}$ and $M^{2+}=Mg^{2+}$, $Ca^{2+}$ or $Zn^{2+}$. Very particularly preferably, $M^{3+}=Fe^{3+}$. Layered double hydroxides with the latter cation have the advantage that they do not contain aluminium cations. This is particularly advantageous for cosmetic applications since aluminium is suspected of being, inter alia, a trigger of Parkinson's disease. The layer thickness of the anion-binding layer is 0.5-500 nm, in particular 1-300 nm.

The said anion-binding layer comprises anion-forming organic, inorganic and/or organometallic colorants. Such colorants may be: anions derived from organic dyes or pigments or from dye or pigment precursors, or inorganic or organic anions or free-radical anions or coloured heteropolyanions or a mixture of the above-mentioned colorants.

Colorants which can be employed for non-cosmetic applications are in principle all anionic or anion-forming dyes. Suitable here are, in particular, C.I. acid dyes, such as, for example: C.I. Acid Yellow 13, C.I. Acid Yellow 17, C.I. Acid Yellow 23, C.I. Acid Yellow 25, C.I. Acid Yellow 36, C.I. Acid Yellow 38, C.I. Acid Yellow 42, C.I. Acid Yellow 44, C.I. Acid Yellow 56, C.I. Acid Yellow 65, C.I. Acid Yellow 76, C.I. Acid Yellow 127, C.I. Acid Orange 7, C.I. Acid Orange 10, C.I. Acid Orange 19, C.I. Acid Orange 65, C.I. Acid Orange 67, C.I. Acid Red 1, C.I. Acid Red 13, C.I. Acid Red 14, C.I. Acid Red 32, C.I. Acid Red 37, C.I. Acid Red 38, C.I. Acid Red 42, C.I. Acid Red 88, C.I. Acid Red 119, C.I. Acid Red 131, C.I. Acid Red 138, C.I. Acid Red 154, C.I. Acid Red 249, C.I. Acid Red 299, C.I. Acid Violet 14, C.I. Acid Violet 42, C.I. Acid Violet 43, C.I. Acid Blue 25, C.I. Acid Blue 40, C.I. Acid Blue 43, C.I. Acid Blue 62, C.I. Acid Blue 92, C.I. Acid Blue 113, C.I. Acid Blue 117, C.I. Acid Blue 129, C.I. Acid Green 1, C.I. Acid Green 25, C.I. Acid Green 41, C.I. Acid Black 1, C.I. Acid Black 24, C.I. Acid Black 26, C.I. Acid Black 48, C.I. Acid Black 210, C.I. Acid Black 234, C.I. Acid Brown 14, C.I. Acid Brown 20.

In addition, C.I. reactive dyes are also suitable, such as, for example: C.I. Reactive Yellow 4, C.I. Reactive Yellow 17, C.I. Reactive Orange 1, C.I. Reactive Red 8, C.I. Reactive Red 12, C.I. Reactive Red 23, C.I. Reactive Blue 15, C.I. Reactive Blue 19, C.I. Reactive Blue 216, C.I. Reactive Black 5, C.I. Reactive Black 8, C.I. Reactive Black 31.

Also suitable are C.I. direct dyes, such as, for example: C.I. Direct Yellow 12, C.I. Direct Yellow 27, C.I. Direct Yellow 29, C.I. Direct Yellow 50, C.I. Direct Yellow 86, C.I. Direct Orange 26, C.I. Direct Red 23, C.I. Direct Red 75, C.I. Direct Red 76, C.I. Direct Red 79, C.I. Direct Red 80, C.I. Direct Red 81, C.I. Direct Red 250, C.I. Direct Blue 78, C.I. Direct Blue 86, C.I. Direct Blue 93, C.I. Direct Blue 106, C.I. Direct Green 26, C.I. Direct Black 19, C.I. Direct Black 22, C.I. Direct Black 51, C.I. Direct Black 150, C.I. Direct Black 151, C.I. Direct Black 166, C.I. Direct Black 168.

Finally, it is also possible to employ C.I. mordant dyes, such as, for example: C.I. Mordant Yellow 1, C.I. Mordant Yellow 5, C.I. Mordant Yellow 30, C.I. Mordant Red 7, C.I. Mordant Red 19, C.I. Mordant Red 30, C.I. Mordant Blue 7, C.I. Mordant Blue 13, C.I. Mordant Black 3, C.I. Mordant Black 9, C.I. Mordant Black 11, C.I. Mordant Brown 33, C.I. Mordant Brown 48, but also C.I. Solubilised Sulphur Red 11, and fluorescent dyes, such as, for example: C.I. Basic Yellow 40, C.I. Basic Red 12, C.I. Solvent Yellow 94.

Preference is given to the use of the anions of organic dyes and pigments or precursors and mixtures thereof which are approved in cosmetic applications. Examples are: FD&C Yellow 5 (tartrazine), FD&C Yellow 6 (Sunset Yellow FCF), FD&C Yellow 10, FD&C Red 3 (erythrosine), FD&C Red 6 (Lithoirubin B), FD&C Red 7 (Litholrubin BN), FD&C Red 21, FD&C Red 27, FD&C Red 28 (Floxine B), FD&C Red 33, C.I. Natural Red 33, FD&C Red 36, FD&C Red 40, Carmine, FD&C Blue 1 (Brilliant Blue FCF), C.I. Natural Green 3 (E141), FD&C Blue, FD&C Black 1 (Brilliant Black).

It is, in particular, also possible to fix mixtures of at least two colorant anions above the anion-binding layer on the substrate. This gives rise to in-numerable colour variants.

The colorants described should only be regarded as illustrative and are merely intended to explain the present invention without limiting it. The various substrates can of course also be combined with other anionic/anion-forming organic or inorganic colorants.

The proportion of the anion-forming organic and/or inorganic colorants is 0.01 to 30% by weight, based on the pigment as a whole, in particular 0.5 to 10% by weight.

In a further embodiment of the present invention, a stabilising inorganic and/or organic coating is additionally applied to the pigment. This post-coating increases, depending on the area of application, the light, water and weather stability. The bleeding stability of the product is also further increased. Examples of coatings of this type are given, for example, in DE 22 15 191, DE 31 51 354, DE 33 34 598, EP 0 632 109, U.S. Pat. No. 5,759,255, DE 43 17 019, DE 39 29 423, DE 32 35 017, EP 0 492 223, EP 0 342 533, EP 0 268 918, EP 0 141 174, EP 0 764 191, WO 98/13426, EP 0 090 259, EP 0 634 459, WO 99157204, WO 96/32446, WO 99/57204, U.S. Pat. No. 5,571,851, WO 01/92425 or EP 0 465 805, the disclosure content of which is hereby incorporated by way of reference. Suitable inorganic materials for the post-coating are the oxides and/or oxide hydrates of Al, Si, Zr, Ce, Zn, Fe and/or mixtures thereof, preferably the oxides and/or oxide hydrates of Al, Ce, Zn, Zr and/or Si. The said layers may be in the form of individual layers of the respective oxides and/or oxide hydrates, but also in the form of mixed layers. In addition, mixtures of oxides with sulfates, phosphates and/or borates can also be employed in addition to the oxides deposited alone. Examples of sulfates are $ZnSO_4$ and $CaSO_4$, examples of phosphates are $AlPO_4$ and $CePO_4$ and an example of borates is $AlBO_4$.

Layers of these materials are distinguished by high transparency, zero or only slight inherent colour and high lustre, meaning that the colouristic properties of the pigment are not modified. Overall, the respective proportions for the additional stabilising coating should be selected so that the optical properties of the pigment according to the invention are not significantly affected.

The organic coating optionally applied acts as coupling reagent and can consist of organosilanes, organoaluminates, organotitanates and/or organozirconates of the general formula

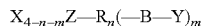

where X=OH, halogen, alkoxy or aryloxy
Z=Si, Al, Ti or Zr
R=alkyl, phenyl or hydrogen
B=organic, at least bifunctional group (alkylene or alkyleneoxyalkylene)
Y=amino, substituted amino, hydroxyl, hydroxyalkyl, siloxane, acetoxy, isocyanate, vinyl, acryloyl, epoxide, epoxypropyloxy, imidazole or ureido group
n and m=0, 1, 2 or 3, where n+m≦3.

The coupling reagents consist of an anchor group ($X_{4-n-m}$ Z), which bonds to the surface, at least one hydrophobic group (R,B) and one or more functional groups (Y). The coupling reagents are preferably compounds where Z=Si. The anchor group preferably consists of alkoxysilanes, which can be converted by hydrolytic reaction conditions into corresponding hydroxyl groups. The latter are able to bond to the surface of the pigment and effect the anchoring via oxygen bridges. In addition, it is also possible to employ mixtures of different coupling reagents, which can be applied as a mixture or individually.

The organic coating can be matched to the use medium through the choice of suitable functional groups. In addition, additional bonds can be formed between pigment and medium via the coupling reagent through reaction of the functional groups with corresponding functionalities in the application media. In a particular embodiment, the surface of the pigment according to the invention is modified with a combination of organic functionalities which is matched to the use medium. Also suitable for this purpose is the use of mixtures of different coupling reagents within the organic coating. The hydrophobicity of the pigment surface can be adapted by integration of alkyl-containing coupling reagents, such as, for example, alkylsilanes. Besides the organosilanes, the use of hydrolysates thereof and of homogeneous and heterogeneous oligomers and/or polymers, which can likewise be employed alone or in combination with silanes, zirconates, aluminates, zirconaluminates and/or carboxyzirconaluminates as organic coating, is also preferred. Particular preference is given to an organic coating comprising mixtures of different coupling reagents, in particular with functional groups Y which are different from one another, which ensures a particularly wide range of applications.

Examples of organosilanes are propyltrimethoxysilane, propyltriethoxysilane, isobutyltrimethoxysilane, n-octyltrimethoxysilane, i-octyltrimethoxysilane, n-octyltriethoxysilane, n-decyltrimethoxysilane, dodecyltrimethoxysilane, hexadecyltrimethoxysilane, vinyltrimethoxysilane, preferably n-octyl-trimethoxysilane and n-octyltriethoxysilane. Suitable oligomeric, alcohol-free organosilane hydrolysates are, inter alia, the products marketed by Sivento under the trade name "Dynasylan®", such as, for example, Dynasylan HS 2926, Dynasylan HS 2909, Dynasylan HS 2907, Dynasylan HS 2781, Dynasylan HS 2776, Dynasylan HS 2627. In addition, oligomeric vinyisilane and aminosilane hydrolysate are suitable as organic coating. Functionalised organosilanes are, for example, 3-aminopropyltrimethoxysilane, 3-methacryloxytrimethoxysilane, 3-glycidyloxypropyltrimethoxysilane, beta-(3,4-epoxycyclohexyl)ethyltrimethoxysilane, gamma-isocyanatopropyltri-methoxysilane, 1,3-bis(3-glycidoxypropyl)-1,1,3,3-tetramethyldisiloxane, ureidopropyltriethoxysilane, preferably 3-aminopropyltrimethoxysilane, 3-methacryloxytrimethoxysilane, 3-glycidyloxypropyltrimethoxysilane, beta-(3,4-epoxycyclohexyl)ethyltrimethoxysilane, gamma-isocyanatopropyltri-methoxysilane. Examples of polymeric silane systems are described in WO 98/13426 and are marketed, for example, by Sivento under the trade name Hydrosil®.

The amount of organic coating is between 0.2 and 5% by weight, based on the pigment, preferably 0.5 to 2% by weight.

The present invention furthermore relates to a process for the preparation of the pigment according to the invention, where a suspension of flake-form substrate, metal cation salts, colorant salts and lyes and/or lye precursors (for example urea) is stirred at a temperature of 10-120° C. in a solvent or solvent mixture so that the anion-binding layer, preferably comprising a layered double hydroxide, forms on the substrate, where the anion-binding layer comprises anion-forming organic, inorganic and/or organometallic colorants, the product is subsequently separated off, washed, dried and optionally sieved.

In the simplest case, the substrate, the metal cation salts and colorant salt(s) are initially introduced in a suspension together with lye and/or lye precursors and stirred at a temperature of 10-120° C. for 2 to 48 hours, depending on the type of LDH and colorant salt employed. After the reaction suspension has been cooled, the product is filtered off with suction and washed with a suitable solvent until the filtrate running out is virtually colourless. The filter cake is subsequently dried at 50-180° C. and optionally sieved to the desired fineness.

In a further variant, a solution of the metal cation salts can be added to a suspension of flake-form substrate, colorant salts and lyes and/or lye precursors. In the simplest case, this means that the substrate, lye and/or lye precursors and colorant salt(s) are initially introduced in a suspension. A solution of the metal cation salts is subsequently added dropwise at room temperature. After completion of the addition, the reaction mixture is heated to 30-100° C. and stirred at this temperature for 2 to 48 hours, depending on the type of LDH and colorant. After the reaction suspension has been cooled, the product is filtered off with suction and washed with a suitable solvent until the filtrate running out is virtually colourless. The filter cake is subsequently dried at 50-180° C. and optionally sieved to the desired fineness.

Suitable lyes are aqueous solutions of NaOH, KOH or $NH_3$, but also lye precursors, such as, for example, urea, which only liberate the actual lye in the reaction medium, for example through hydrolysis. The pH during the reaction (which means the pH behaviour throughout the reaction) is usually in the range from 2 to 13, in particular from 3 to 11.

Suitable metal cation salts are in principle all salts with $Al^{3+}$, $Cr^{3+}$, $Fe^{3+}$, $Ga^{3+}$, $In^{3+}$, $y^{3+}$, $La^{3+}$, $Ce^{3+}$, $Ba^{2+}$, $Ca^{2+}$, $Cu^{2+}$, $Mg^{2+}$, $Sr^{2+}$ and/or $Zn^{2+}$ cations, from which the anion-binding layer, in particular comprising a layered double hydroxide, can be produced.

In particular, the said metal cation salts are the corresponding halides, in particular chlorides, bromides or iodides. However, metal cation salts with sulfate or nitrate anions are also suitable. The corresponding chlorides are very particularly preferably employed.

In an alternative, two-step variant of the preparation of the pigment according to the invention, a suspension of flake-form substrate, metal cation salts and lyes and/or urea is stirred at a temperature of 10-120° C. in a solvent or solvent mixture so that the anion-binding layer, in particular comprising a layered double hydroxides, forms on the substrate, the intermediate is then separated off, washed, dried at 50-300° C. and optionally sieved. This LDH-coated substrate is subsequently added to a solution of the anion-forming organic, inorganic and/or organometallic colorants with stirring, In this process variant, ion exchange occurs, where the anion $Z^{n-}$ of the anion-binding double hydroxide is replaced by the anion-forming colorant. After the reaction suspension has been cooled, the product is filtered off with suction and washed. The filter cake is dried at 40-100° C. The dry pigment can subsequently optionally be ground and/or sieved.

In the last-mentioned method, the metal salts employed should preferably be corresponding chlorides or nitrates since these two anions are replaced by the colorant anion the fastest in the subsequent step. This two-step method is also particularly suitable for temperature-sensitive colorants since, compared with the other processes, the colorant-containing end product can be dried at significantly lower temperature.

It has, in addition, also proven advantageous in this two-step synthesis variant to calcine the intermediate at temperatures of 300-600° C. with the anion-binding layer, preferably comprising a layered double hydroxide, formed on the substrate before addition to the solution of the anion-forming organic and/or inorganic colorants. The substrate, preferably coated with LDH, here is firstly converted by calcination at 300-600° C. into an LDO-coated substrate. The LDO ("layered double oxide") subsequently re-forms the LDH structure in aqueous or water-containing medium and facilitates easier and more complete intercalation. In an alternative variant of the two-step process described above, it is also possible firstly to prepare a suspension of the LDH- or LDO-coated substrate, to which a solution of the colorant anion is then added at 20-70° C. with stirring. The mixture can usually be stirred at this temperature for 2 to 48 h. When fixing of the colorant anion is complete, the product is filtered off with suction and washed with a suitable solvent until the filtrate running out is virtually colourless. The filter cake is subsequently dried at 40-70° C. and optionally sieved to the desired fineness.

In addition, an inorganic and/or organic coating can additionally be applied as outer layer in a process which is likewise in accordance with the invention. Examples of coating processes of this type are given, inter alia, in EP 0 632 109, U.S. Pat. No. 5,759,255, DE 43 17 019, DE 39 29 423, DE 32 35 017, EP 0 492 223, EP 0 342 533, EP 0 268 918, EP 0 141 174, EP 0 764 191, WO 98/13426 or EP 0 465 805. Examples of inorganic and/or organic coatings and the associated advantages have already been described above under synthesis of the pigment according to the invention. The process step of application of the organic coating can be carried out immediately after the other steps of the process according to the invention. The coupling reagents are applied in solution at temperatures above 60° C., preferably above 70° C. Suitable solvents are organic solvents, water or mixtures thereof, preferably water. The reaction time necessary for application of the organic coating is at least 5 minutes, it preferably taking place over a period of 10 to 90 minutes, but this can also be extended as desired. The pigment obtained is worked up and isolated by methods which are familiar to the person skilled in the art, for example by filtration, drying and sieving.

The pigment according to the invention can be employed in a variety of applications. Accordingly, the present invention likewise relates to the use of the pigment according to the invention in cosmetics, paints, coatings, plastics, films, in security printing, in security features in documents and identity cards, for coloring seed, for coloring foods or in medicament coatings and for the preparation of pigment compositions and dry preparations.

In the case of cosmetics, the pigment according to the invention is particularly suitable for products and formulations in decorative and care cosmetics, such as, for example, ointments, creams, pastes, nail varnishes, coloring powders, lipsticks or eye shadows, soaps, toothpastes, etc. The pigment according to the invention can of course also be combined in the formulations with cosmetic raw materials and assistants of all types. These include, inter alia, oils, fats, waxes, film formers, preservatives and assistants which generally determine the applicational properties, such as, for example, thickeners and Theological additives, such as, for example, bentonites, hectorites, silicon dioxide, Ca silicates, gelatine, high-molecular-weight carbohydrates and/or surface-active assistants, etc. Formulations comprising the pigment according to the invention may be of the lipophilic, hydrophilic or hydrophobic type. In the case of heterogeneous formulations having discrete aqueous and non-aqueous phases, the pigment according to the invention may be present in each case in only one of the two phases or alternatively distributed over both phases.

The pH values of the aqueous formulations can be between 5 and 14, preferably between 5 and 11 and particularly preferably between 6 and 9. The concentration of the pigment according to the invention in the formulation is unlimited. It may—depending on the application—be between 0.001 (rinse-off products, for example shower gels) and 99% (for example lustre-effect articles for particular applications). The pigment according to the invention may furthermore also be combined with cosmetic active ingredients. Suitable active ingredients are, for example, insect repellents, UV A/BC protection filters (for example OMC, B3, MBC), anti-aging active ingredients, vitamins and derivatives thereof (for example vitamin A, C, E, etc.), self-tanning agents (for example DHA, erythrulose, inter alia), and further cosmetic active ingredients, such as, for example, bisabolol, LPO, ectoine, emblica, allantoin, bioflavonoids and derivatives thereof.

Organic UV filters are generally incorporated into cosmetic formulations in an amount of 0.5 to 10 per cent by weight, preferably 1-8%, and inorganic filters in an amount of 0.1 to 30%.

The preparations according to the invention may in addition comprise further conventional skin-protecting or skin-care active ingredients. These may in principle be any active ingredients known to the person skilled in the art.

Particularly preferred active ingredients are pyrimidinecarboxylic acids and/or aryl oximes.

Of the cosmetic applications, particular mention should be made of the use of ectoine and ectoine derivatives for the care of aged, dry or irritated skin. Thus, European patent application EP-A-0 671 161 describes, in particular, that ectoine and hydroxyectoine are employed in cosmetic preparations, such as powders, soaps, surfactant-containing cleansing products, lipsticks, rouge, make-up, care creams and sunscreen compositions.

Application forms of the cosmetic formulations which may be mentioned are, for example: solutions, suspensions, emulsions, PIT emulsions, pastes, ointments, gels, creams, lotions, powders, soaps, surfactant-containing cleansing compositions, oils, aerosols and sprays. Examples of other application forms are sticks, shampoos and shower preparations. Any desired customary carriers, assistants and, if desired, further active ingredients may be added to the preparation.

Ointments, pastes, creams and gels may comprise the customary carriers, for example animal and vegetable fats, waxes, paraffins, starch, tragacanth, cellulose derivatives, polyethylene glycols, silicones, bentonites, silica, talc and zinc oxide, or mixtures of these substances.

Powders and sprays may comprise the customary carriers, for example lactose, talc, silica, aluminium hydroxide, calcium silicate and polyamide powder, or mixtures of these substances. Sprays may additionally comprise the customary propellants, for example chlorofluorocarbons, propane/butane or dimethyl ether.

Solutions and emulsions may comprise the customary carriers, such as solvents, solubilisers and emulsifiers, for example water, ethanol, isopropanol, ethyl carbonate, ethyl acetate, benzyl alcohol, benzyl benzoate, propylene glycol, 1,3-butyl glycol, oils, in particular cottonseed oil, peanut oil, wheatgerm oil, olive oil, castor oil and sesame oil, glycerol fatty acid esters, polyethylene glycols and fatty acid esters of sorbitan, or mixtures of these substances.

Suspensions may comprise the customary carriers, such as liquid diluents, for example water, ethanol or propylene glycol, suspension media, for example ethoxylated isostearyl alcohols, polyoxyethylene sorbitol esters and polyoxyethylene sorbitan esters, microcrystalline cellulose, aluminium metahydroxide, bentonite, agar-agar and tragacanth, or mixtures of these substances.

Soaps may comprise the customary carriers, such as alkali metal salts of fatty acids, salts of fatty acid monoesters, fatty acid protein hydrolysates, isothionates, lanolin, fatty alcohol, vegetable oils, plant extracts, glycerol, sugars, or mixtures of these substances.

Surfactant-containing cleansing products may comprise the customary carriers, such as salts of fatty alcohol sulfates, fatty alcohol ether sulfates, sulfosuccinic acid monoesters, fatty acid protein hydrolysates, isothionates, imidazolinium derivatives, methyl taurates, sarcosinates, fatty acid amide ether sulfates, alkylamidobetaines, fatty alcohols, fatty acid glycerides, fatty acid diethanolamides, vegetable and synthetic oils, lanolin derivatives, ethoxylated glycerol fatty acid esters, or mixtures of these substances.

Face and body oils may comprise the customary carriers, such as synthetic oils, such as, for example, fatty acid esters, fatty alcohols, silicone oils, natural oils, such as vegetable oils and oily plant extracts, paraffin oils, lanolin oils, or mixtures of these substances.

The cosmetic preparations may exist in various forms. Thus, they can be, for example, a solution, a water-free preparation, an emulsion or microemulsion of the water-in-oil (W/O) or oil-in-water (O/W) type, a multiple emulsion, for example of the water-in-oil-in-water (W/O/W) type, a gel, a solid stick, an ointment or an aerosol. It is also advantageous to administer ectoines in encapsulated form, for example in collagen matrices and other conventional encapsulation materials, for example as cellulose encapsulations, in gelatine, wax matrices or liposomally encapsulated. In particular, wax matrices, as described in DE-A 43 08 282, have proven favourable. Preference is given to emulsions. O/W emulsions are particularly preferred. Emulsions, W/O emulsions and O/W emulsions are obtainable in a conventional manner.

Further embodiments are oily lotions based on natural or synthetic oils and waxes, lanolin, fatty acid esters, in particular triglycerides of fatty acids, or oily-alcoholic lotions based on a lower alcohol, such as ethanol, or a glycerol, such as propylene glycol, and/or a polyol, such as glycerol, and oils, waxes and fatty acid esters, such as triglycerides of fatty acids.

Solid sticks consist of natural or synthetic waxes and oils, fatty alcohols, fatty acids, fatty acid esters, lanolin and other fatty substances.

If a preparation is formulated as an aerosol, the customary propellants, such as alkanes, fluoroalkanes and chlorofluoroalkanes, are generally used.

The cosmetic preparation may also be used to protect the hair against photochemical damage in order to prevent colour changes, bleaching or damage of a mechanical nature. In this case, a suitable formulation is in the form of a rinse-out shampoo, lotion, gel or emulsion, the preparation in question being applied before or after shampooing, before or after coloring or bleaching or before or after permanent waving. It is also possible to select a preparation in the form of a lotion or gel for styling or treating the hair, in the form of a lotion or gel for brushing or blow-waving, in the form of a hair lacquer, permanent waving composition, colorant or bleach for the hair, The preparation having light-protection properties may comprise assistants, such as surfactants, thickeners, polymers, softeners, preservatives, foam stabilisers, electrolytes, organic solvents, silicone derivatives, oils, waxes, antigrease agents, dyes and/or pigments which colour the composition itself or the hair, or other ingredients usually used for hair care.

In the case of the use of the pigment in paints and coatings, all areas of application known to the person skilled in the art are possible, such as, for example, powder coatings, automobile paints, printing inks for gravure, offset, screen or flexographic printing, and coatings in outdoor applications. The paints and coatings here can be, for example, radiation-curing, physically drying or chemically curing. A multiplicity of binders is suitable for the preparation of printing inks or liquid surface coatings, for example based on acrylates, methacrylates, polyesters, polyurethanes, nitrocellulose, ethylcellulose, polyamide, polyvinyl butyrate, phenolic resins, maleic resins, starch or polyvinyl alcohol, amino resins, alkyd resins, epoxy resins, polytetrafluoroethylene, polyvinylidene fluorides, polyvinyl chloride or mixtures thereof, in particular water-soluble grades. The surface coatings can be powder coatings or water- or solvent-based coatings, where the choice of the coating constituents is part of the general knowledge of the person skilled in the art. Common polymeric binders for powder coatings are, for example, polyesters, epoxides, polyurethanes, acrylates or mixtures thereof.

In addition, the pigment according to the invention can be used in films and plastics, for example in agricultural sheeting, infrared-reflective foils and sheets, gift foils, plastic containers and mouldings for all applications known to the person skilled in the art. Suitable plastics for the incorporation of the pigment according to the invention are all common plastics, for example thermosets or thermoplastics. The description of the possible applications and the plastics which can be employed, processing methods and additives are given, for example, in RD 472005 or in R. Glausch, M. Kieser, R. Maisch, G. Pfaff, J. Weitzel, Perlglanzpigmente [Pearlescent Pigments], Curt R. Vincentz Verlag, 1996, 83 ff., the disclosure content of which is also incorporated herein.

In addition, the pigment according to the invention is also suitable for use in security printing and in security-relevant features for, for example, forgery-proof cards and identity cards, such as, for example, entry tickets, personal identity cards, banknotes, cheques and cheque cards, and for other forgery-proof documents. In the area of agriculture, the pigment can be used for coloring seed and other starting materials, in addition in the food sector for pigmenting foods. The pigment according to the invention can likewise be employed for pigmenting coatings in medicaments, such as, for example, tablets or dragees.

The pigment according to the invention is likewise suitable in the above-mentioned areas of application for use in blends with organic and/or inorganic dyes and/or pigments, such as, for example, transparent and opaque white, coloured and black pigments, and with flake-orm iron oxides, organic pigments, holographic pigments, LCPs (liquid crystal polymers) and conventional transparent, coloured and black lustre pigments based on metal oxidecoated flakes based on mica, glass, $Al_2O_3$, $Fe_2O_3$, $SiO_2$, etc. Examples and embodiments of the above-mentioned materials and pigment structures are also given, for example, in Research Disclosures RD 471001 and RD 472005, the disclosure contents of which are incorporated herein by way of reference. The pigment according to the invention can be mixed in any ratio with commercially available pigments and fillers.

Fillers which may be mentioned are, for example, natural and synthetic mica, nylon powder, pure or filled melamine resins, talc, glasses, kaolin, oxides or hydroxides of aluminium, magnesium, calcium, zinc, BiOCl, barium sulfate, calcium sulfate, calcium carbonate, magnesium carbonate, carbon, and physical or chemical combinations of these substances. There are no restrictions with respect to the particle shape of the filler. It can be, for example, flake-form, spherical or needle-shaped in accordance with requirements.

The pigment according to the invention is furthermore suitable for the preparation of flowable pigment compositions and dry preparations comprising one or more particles according to the invention, binders and optionally one or more additives. Dry preparations are also taken to mean preparations which comprise 0 to 8% by weight, preferably 2 to 8% by weight, in particular 3 to 6% by weight, of water and/or a solvent or solvent mixture. The dry preparations are preferably in the form of pellets, granules, chips, sausages or briquettes and have particle sizes of 0.2-80 mm. The dry preparations are used, in particular, in the preparation of printing inks and in cosmetic formulations.

The present invention furthermore relates to cosmetics, paints, coatings, plastics, films, documents and identity cards, seed, foods or medicament coatings, as well as pigment compositions and dry preparations comprising a pigment according to the present invention.

The complete disclosure content of all patent applications, patents and publications mentioned above is incorporated into this application by way of reference.

The following examples are intended to explain the invention in greater detail, but without limiting it.

EXAMPLES

Example 1

50 g of glass flakes (ECR glass; fraction: 10-100 μm, substrate thickness: 850 nm) are added to 300 ml of water and 150 ml of NaOH (0.5 M). After stirring for 30 min, 5.8 g of C.I. FD&C Red 6 "Unipure Red LC303" are added as colorant precursor. 10.15 g of $MgCl_2 \times 6H_2O$, 6.05 g of $AlCl_3 \times 6H_2O$ and 20.95 g of urea are each dissolved in about 100 ml of water and likewise added. The mixture is stirred under reflux for 24 h. The suspension is allowed to cool, and the residue is filtered off with suction and washed with water until the filtrate running out is virtually colourless. The residue is dried at 50° C., giving a pigment having a bright red powder colour which exhibits a clear glitter effect at the same time as very good hiding power.

Example 2

50 g of a red interference pigment (ECR glass coated with about 4% by weight of $SiO_2$, about 1% by weight of $SnO_2$ and about 25% by weight of $TiO_2$; fraction: 10-100 μm, substrate thickness: 850 nm) are added to 190 ml of water and 310 ml of NaOH (0.5 M). After stirring for 30 min, 5.8 g of C.I. FD&C Red 6 "Unipure Red LC303" are added as colorant precursor, 10.15 g of $MgCl_2 \times 6H_2O$ and 6.05 g of $AlCl_3 \times 6H_2O$ are dissolved together in about 150 ml of water and added over the course of one hour with stirring. The mixture is subsequently made up to a total volume of 750 ml with water. The mixture is stirred under reflux for 24 h. The suspension is allowed to cool, and the residue is filtered off with suction and washed with water until the filtrate running out is virtually colourless. The residue is dried at 110° C., giving a pigment having a bright red powder colour which is superposed by a red interference colour and at the same time has a clear glitter effect at the same time as very good hiding power.

Example 3 a) 50 g of a violet interference pigment (ECR glass coated with about 4% by weight of $SiO_2$, about 1% by weight of $SnO_2$ and about 27% by weight of $TiO_2$; fraction: 10-100 μm, substrate thickness: 850 nm) are added to 190 ml of water and 310 ml of NaOH (0.5 M). After stirring for 30 min, a solution of 10.15 g of $MgCl_2 \times 6H_2O$ and 6.05 g of $AlCl_3 \times 6H_2O$ in 150 ml of water is added over the course of one hour with stirring. The mixture is subsequently made up to a total volume of 750 ml with water. The mixture is stirred under reflux for 24 h. The suspension is allowed to cool, and the residue is filtered off with suction and washed with about two liters of water. The residue is dried at 50° C.

b) 50 g of a violet interference pigment (ECR glass coated with about 4% by weight Of $SiO_2$, about 1% by weight of $SnO_2$ and about 27% by weight of $TiO_2$; fraction: 10-100 μm, substrate thickness: 850 nm) are added to 190 ml of water and 310 ml of NaOH (0.5 M). After stirring for 30 min, a solution of 10.15 g of $MgCl_2 \times 6H_2O$ and 6.05 g of $AlCl_3 \times 6H_2O$ in 150 ml of water are added over the course of one hour with stirring. The mixture is subsequently made up to a total volume of 750 ml with water. The mixture is stirred under reflux for 24 h. The suspension is allowed to cool, and the residue is filtered off with suction and washed with about two liters of water. The residue is firstly dried at 110° C. and subsequently calcined at 300-600° C. In the process, the LDH layer on the substrate is converted into a layered double oxide layer (LDO layer).

c) 25 g of intermediate from step a) or 20 g of intermediate from step b) are suspended in 135 ml of water with stirring. 2.9 g of C.I. FD&C Red 6 "Unipure Red LC303" are added as dye. The pH of the mixture is adjusted to 12. The suspension is stirred for 12-24 hours, the solid is filtered off with suction and washed with water until the filtrate running out is virtually colourless, and the product is subsequently dried at 50° C. In a particularly preferred procedure, a fully saturated, aqueous solution of 2.9 g of C.I. FD&C Red 6 "Unipure Red LC303" is initially introduced at pH=12.25 g of intermediate from step a) or 20 g of intermediate from step b) are then suspended therein with stirring. In this procedure too, the suspension is stirred for 12-24 hours, the solid is filtered off with suction and washed with water until the filtrate running out is virtually colourless, and the product is subsequently dried at 50° C.

Both procedures give a pigment having a bright red powder colour which is superposed by a bluish-red to violet interference colour and at the same time has a clear glitter effect at the same time as very good hiding power.

Use examples:

Eye Shadow Gel

Phase A

| Raw material | Source of supply | INCI | [%] |
| --- | --- | --- | --- |
| Red pigment according to Example 2 | Merck KGaA/Rona ® | Calcium Aluminum Borosilicate, CI 77891 (Titanium Dioxide), Magnesium Hydroxide, CI 15850, CI 77492 (Iron Oxides), Silica, Tin Oxide | 15.00 |
| Micronasphere M | Merck KGaA/Rona ® | Mica, Silica | 8.00 |
| Carbopol Ultrez 21 | Noveon | ACRYLATES/C10-30 ALKYL ACRYLATE CROSSPOLYMER | 0.40 |
| Citric acid monohydrate | Merck KGaA/Rona ® | CITRIC ACID | 0.00 |
| Water | | AQUA (WATER) | to 100 |

Phase B

| Raw material | Source of supply | INCI | [%] |
| --- | --- | --- | --- |
| Glycerin | Merck KGaA/Rona ® | GLYCERIN | 3.00 |
| Preservative | | | q.s. |
| Triethanolamine | | TRIETHANOLAMINE | 0.70 |
| Water | | AQUA (WATER) | 13.00 |

Phase C

| Raw material | Source of supply | INCI | [%] |
| --- | --- | --- | --- |
| Lubrajel DV | | PROPYLENE GLYCOL, POLYGLYCERYL METHACRYLATE | 5.00 |

Preparation:

Disperse the red pigment and Micronasphere® M in the water of phase A. Acidify using a few drops of citric acid in order to reduce the viscosity, scatter in the Carbopol with stirring. When completely dissolved, slowly stir in the predissolved phase B and subsequently phase C. Finally, adjust the pH to between 7.0-7.5.

Rouge Powder

Phase A

| Raw material | Source of supply | INCI | [%] |
| --- | --- | --- | --- |
| Red pigment according to Example 2 | Merck KGaA/Rona ® | Calcium Aluminum Borosilicate, CI 77891 (Titanium Dioxide), Magnesium Hydroxide, CI 15850, CI 77492 (Iron Oxides), Silica, Tin Oxide | 30.00 |
| Talc | Merck KGaA/Rona ® | TALC | 49.50 |
| Magnesium stearate | Merck KGaA/Rona ® | MAGNESIUM STEARATE | 2.50 |
| Potato starch | Suedstaerke GmbH | SOLANUM TUBEROSUM (POTATO STARCH) | 7.50 |

Phase B

| Raw material | Source of supply | INCI | [%] |
| --- | --- | --- | --- |
| Isopropyl stearate | cognis GmbH | ISOPROPYL STEARATE | 9.34 |
| Cetyl palmitate | Merck KGaA/Rona ® | CETYL PALMITATE | 0.53 |
| Ewalin 1751 | H. Erhard Wagner GmbH | PETROLATUM | 0.53 |
| Propyl 4-hydroxybenzoate | Merck KGaA/Rona ® | PROPYLPARABEN | 0.10 |

Preparation:

Combine and pre-mix the constituents of phase A. Subsequently add the molten phase B dropwise with stirring to the powder mixture. The powders are pressed at 40-50 bar.

Lipstick

Phase A

| Raw material | Source of supply | INCI | [%] |
| --- | --- | --- | --- |
| Red pigment according to Example 2 | Merck KGaA/Rona ® | Calcium Aluminum Borosilicate, CI 77891 (Titanium Dioxide), Magnesium Hydroxide, CI 15850, CI 77492 (Iron Oxides), Silica, Tin Oxide | 12.00 |
| Ronastar ®Purple Sparks | Merck KGaA/Rona ® | Calcium Aluminum Borosilicate, CI 77891 (Titanium Dioxide), Silica, Tin Oxide | 3.00 |

Phase B

| Raw material | Source of supply | INCI | [%] |
| --- | --- | --- | --- |
| Beeswax | Merck KGaA/Rona ® | Cera Alba (Beeswax) | 8.75 |
| Paracera C44 | Paramelt | COPERNICIA CERIFERA (CARNAUBA WAX), CERESIN | 5.25 |
| Adeps Lanae | Henry Lamotte GmbH | LANOLIN | 3.50 |
| Isopropyl myristate | Cognis GmbH | Isopropyl Myristate | 5.60 |
| Liquid paraffin | Merck KGaA/Rona ® | PARAFFINUM LIQUIDUM (MINERAL OIL) | 2.10 |

-continued

| Raw material | Source of supply | INCI | [%] |
|---|---|---|---|
| Castor oil | Henry Lamotte GmbH | RICINUS COMMUNIS (CASTOR OIL) | 59.65 |
| Oxynex K liquid | Merck KGaA/Rona ® | PEG-8, TOCPHEROL, ASCORBYL PALMITATE ASCORBIC ACID, CITRIC ACID | 0.05 |
| Propyl 4-hydroxy-benzoate | Merck KGaA/Rona ® | PROPYLPARABEN | 0.10 |

Preparation:

The constituents of phase B are heated to 75° C. and melted. The pigments of phase A are added, and everything is stirred well. The lipstick composition is then stirred for 15 minutes in the casting apparatus held at a temperature of 65° C. The homogeneous melt is poured into the casting mould which has been pre-warmed to 55° C. The moulds are subsequently cooled, and the castings are removed when cold. After the lipsticks have been warmed to room temperature, the lipsticks are briefly flame-treated.

Nail varnish

| Raw material | Source of supply | INCI | [%] |
|---|---|---|---|
| Red pigment according to Example 2 | Merck KGaA/Rona ® | Calcium Aluminum Borosilicate, CI 77891 (Titanium Dioxide), Magnesium Hydroxide, CI 15850, CI 77492 (Iron Oxides), Silica, Tin Oxide | 2.00 |
| Nailsyn ® Sterling 60 Silver | Merck KGaA/Rona ® | CI 77163 (Bismuth Oxychloride), Butyl Acetate, Nitrocellulose, Isopropyl Alcohol, Ethyl Acetate, Stearalkonium Hectorite | 1.00 |
| Thixotropic nail varnish base 155 | Durlin/Bergerac NC | BUTYL ACETATE, ETHYL ACETATE NITROCELLULOSE, ACETYL TRIBUTYL CITRATE, PHTHALIC ANHYDRIDE/TRIMELLITIC ANHYDRIDE/GLYCOLS COPOLYMER, ISOPROPYL ALCOHOL, STEARALKONIUM HECTORITE, ADIPIC ACID/FUMARIC ACID/PHTHALIC ACID/TRICYCLODECANE DIMETHANOL COPOLYMER, CITRIC ACID | 97.00 |

Preparation:

The pigment is weighed out together with the varnish base, mixed well by hand using a spatula and subsequently stirred for 10 min at 1000 rpm.

Volume Mascara

Phase A

| Raw material | Source of supply | INCI | [%] |
|---|---|---|---|
| Red pigment according to Example 2 | Merck KGaA/Rona ® | Calcium Aluminum Borosilicate, CI 77891 (Titanium Dioxide), Magnesium Hydroxide, CI 15850, CI 77492 (Iron Oxides), Silica, Tin Oxide | 10.00 |
| Satin mica | Merck KGaA/Rona ® | MICA | 2.00 |

Phase B:

| Raw material | Source of supply | INCI | [%] |
|---|---|---|---|
| Dow Corning 556 | Dow Corning | PHENYL TRIMETHICONE | 2.00 |
| Tegosoft CT | Degussa-Goldschmidt AG | CAPRYLIC CAPRIC TRIGLYCERIDE | 2.50 |
| Syncrowachs HRC | Croda GmbH | TRIBEHENIN | 3.50 |
| Tegin M | Degussa-Goldschmidt AG | GLYCERYL STEARATE | 3.50 |
| Beeswax | Merck KGaA/Rona ® | CERA ALBA (BEESWAX) | 3.00 |
| Stearic acid | Merck KGaA/Rona ® | STEARIC ACID | 5.00 |
| Phenonip | Nipa Laboratorien GmbH | PHENOXYETHANOL, BUTYLPARABEN, ETHYLPARABEN, PROPYLPARABEN, METHYLPARABEN | 0.80 |
| RonaCare ® tocopherol acetate | Merck KGaA/Rona ® | TOCOPHEROL ACETATE | 0.50 |
| Dermacryl 79 | Amerchol | ACRYLATES/OCTYL-ACRYLAMIDE COPOLYMER | 3.50 |

Phase C

| Raw material | Source of supply | INCI | [%] |
|---|---|---|---|
| Water (demineralised) | | AQUA (WATER) | 59.15 |
| AMP Ultra PC 1000 | Angus Chemie GmbH | AMINOMETHYL PROPANOL | 1.25 |
| 1,3-Butanediol | Merck KGaA/Rona ® | BUTYLENE GLYCOL | 1.00 |
| RonaCare ® Biotin Puls | Merck KGaA/Rona ® | UREA, DISODIUM PHOSPHATE, BIOTIN, CITRIC ACID | 0.50 |

Phase D

| Raw material | Source of supply | INCI | [%] |
|---|---|---|---|
| Germall 115 | ISP Global Technologies | IMIDAZOLIDINYL UREA | 0.30 |
| Water (demineralised) | | AQUA (WATER) | 1.50 |

Preparation:

Melt all constituents of phase B, apart from Demacryl 79, together at about 85° C., add Demacryl 79 with stirring, and leave to stir for 20 min until everything is homogeneously distributed. Heat the constituents of phase C to about 85° C. Stir the red pigment of phase A into phase C. Add phase C to phase B, continue stirring, and homogenise using the Ultra-Turrax T25 for 1 min at 8000 rpm. Allow to cool with stirring, and add phase D at 40° C.

Soap

| Raw material | Source of supply | INCI | [%] |
|---|---|---|---|
| Red pigment according to Example 2 | Merck KGaA/Rona ® | Calcium Aluminum Borosilicate, CI 77891 (Titanium Dioxide), Magnesium Hydroxide, CI 15850, CI 77492 (Iron Oxides), Silica, Tin Oxide | 1.50 |
| Ronastar ® Noble Sparks | Merck KGaA/Rona ® | Calcium Aluminum Borosilicate, Silica, CI 77891 (Titanium Dioxide), Tin Oxide | 0.50 |
| Transparent soap base | Jean Charles (USA) | SODIUM PALMATE, SODIUM LAURETH SULFATE, SODIUM STEARATE, SODIUM MYRISTATE, SODIUM COCOYL ISETHIONATE, TRIETHANOLAMINE, AQUA (WATER), GLYCERIN, SORBITOL, PROPYLENE GLYCOL, FRAGRANCE | 98.00 |

Preparation:

All constituents are mixed homogeneously.

Cheek and Eye Colour

Phase A

| Raw material | Source of supply | INCI | [%] |
|---|---|---|---|
| Red pigment according to Example 2 | Merck KGaA/Rona ® | Calcium Aluminum Borosilicate, CI 77891 (Titanium Dioxide), Magnesium Hydroxide, CI 15850, CI 77492 (Iron Oxides), Silica, Tin Oxide | 13.00 |
| Satin mica | Merck KGaA/Rona ® | MICA | 10.80 |
| Eusolex ® T-S | Merck KGaA/Rona ® | TITANIUM DIOXIDE, ALUMINA, STEARIC ACID | 5.00 |
| Talc | Merck KGaA/Rona ® | TALC | 4.00 |
| Timiron ® Arctic Silver | Merck KGaA/Rona ® | CI 77891 (TITANIUM DIOXIDE), MICA, SILICA | 4.00 |
| Mica Black | Merck KGaA/Rona ® | CI 77499 (IRON OXIDES), MICA, CI 77891 (TITANIUM DIOXIDE) | 1.80 |
| Ronastar ® Silver | Merck KGaA/Rona ® | CALCIUM ALUMINUM BOROSILICATE, SILICA, CI 77891 (TITANIUM DIOXIDE), TIN OXIDE | 0.40 |

-continued

| Raw material | Source of supply | INCI | [%] |
|---|---|---|---|
| Unipure Blue LC 680 | Les Colorants Wackherr | CI 77007 (ULTRAMARINE BLUE) | 1.00 |

Phase B.

| Raw material | Source of supply | INCI | [%] |
|---|---|---|---|
| Crodamol PMP | Croda GmbH | PPG-2 MYRISTYL ETHER PROPIONATE | 24.40 |
| Miglyol 812 N | Sasol Germany GmbH | CAPRYLIC/CAPRIC TRIGLYCERIDE | 12.00 |
| Syncrowax HGLC | Croda GmbH | C18-36 ACID TRIGLYCERIDE | 8.00 |
| Myritol 331 | Cognis GmbH | COCOGLYCERIDES | 7.90 |
| Kester wax K 82 P | Koster Keunen Holland BV | SYNTHETIC WAX | 5.00 |
| Antaron V-216 | ISP Global Technologies | PVP/HEXADECENE COPOLYMER | 2.00 |

Phase C

| Raw material | Source of supply | INCI | [%] |
|---|---|---|---|
| Oxynex ® K liquid | Merck KGaA/Rona ® | PEG-8, TOCOPHEROL, ASCORBYL PALMITATE, ASCORBIC ACID, CITRIC ACID | 0.10 |
| Phenonip | Nipa Laboratorien GmbH | PHENOXYETHANOL, BUTYLPARABEN, ETHYLPARABEN, PROPYLPARABEN, METHYLPARABEN | 0.60 |

Preparation:

Heat phase B to about 85° C. until everything has melted, and cool to 75° C. Then add the ingredients of phases A and C with stirring, and package the finished composition at 75° C.

Shampoo

Phase A

| Raw material | Source of supply | INCI | [%] |
|---|---|---|---|
| Red pigment according to Example 2 | Merck KGaA/Rona ® | Calcium Aluminum Borosilicate, CI 77891 (Titanium Dioxide), Magnesium Hydroxide, CI 15850, CI 77492 (Iron Oxides), Silica, Tin Oxide | 0.20 |
| Carbopol ETD 2020 | Noveon | ACRYLATES/C10-30 ALKYL ACRYLATE CROSSPOLYMER | 0.90 |
| Water, demineralised | | AQUA (WATER) | 63.40 |

Phase B:

| Raw material | Source of supply | INCI | [%] |
|---|---|---|---|
| Triethanolamine | | TRIETHANOLAMINE | 0.90 |
| Water, demineralised | | AQUA (WATER) | 10.00 |

Phase C

| Raw material | Source of supply | INCI | [%] |
|---|---|---|---|
| Plantacare 2000 UP | Cognis GmbH | DECYL GLUCOSIDE | 20.00 |
| Texapon ASV 50 | Cognis GmbH | SODIUM LAURETH SULFATE, SODIUM LAURETH-8 SULFATE, MAGNESIUM LAURETH SULFATE, MAGNESIUM LAURETH-8 SULFATE, SODIUM OLETH SULFATE, MAGNESIUM OLETH SULFATE | 4.35 |
| Bronidox L | Cognis GmbH | PROPYLENE GLYCOL, 5-BROMO-5-NITRO-1,3-DIOXANE | 0.20 |
| Perfume oil 200 524 | Fragrance Resources | PARFUM | 0.05 |

Preparation:

For phase A, stir the pigment into the water. Acidify using a few drops of citric acid (10%) in order to reduce the viscosity, and slowly scatter in the Carbopol with stirring. When completely dissolved, slowly add phase B. Then add the constituents of phase C successively. Adjust the pH to 6.0-6.5.

Hair Gel

Phase A

| Raw material | Source of supply | INCI | [%] |
|---|---|---|---|
| Red pigment according to Example 2 | Merck KGaA/Rona® | Calcium Aluminum Borosilicate, CI 77891 (Titanium Dioxide), Magnesium Hydroxide, CI 15850, CI 77492 (Iron Oxides, Silica, Tin Oxide | 0.65 |
| Ronastar® Red Sparks | Merck KGaA/Rona® | CALCIUM ALUMINUM BOROSILICATE, CI 77891(TITANIUM DIOXIDE), SILICA, TIN OXIDE | 2.00 |
| Carbopol Ultrez 21 | Noveon | ACRYLATES/C10-30 ALKYL ACRYLATE CROSSPOLYMER | 0.90 |
| Water, demineralised | | AQUA (WATER) | 50.35 |

Phase B:

| Raw material | Source of supply | INCI | [%] |
|---|---|---|---|
| Luviskol K 30 powder | BASF AG | PVP | 2.00 |

-continued

| Raw material | Source of supply | INCI | [%] |
|---|---|---|---|
| Germaben II | ISP Global Technologies | PROPYLENE GLYCOL, DIAZOLIDINYL UREA, METHYLPARABEN, PROPYLPARABEN | 1.00 |
| Triethanolamine | | TRIETHANOLAMINE | 2.16 |
| Water, demineralised | | AQUA (WATER) | 40.94 |

Preparation:

Disperse the pearlescent pigments in the water of phase A, and scatter in the Carbopol with stirring. When completely dissolved, slowly stir in the predissolved phase B.

The preceding examples can be repeated with similar success by substituting the generically or specifically described reactants and/or operating conditions of this invention for those used in the preceding examples.

The entire disclosures of all applications, patents and publications, cited herein and of corresponding European application No. 06008237.7, filed Apr. 21, 2006 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A pigment comprising a flake-form substrate and an anion-binding layer which comprises an anion-forming organic, inorganic and/or organometallic colorant, wherein natural and synthetic clay minerals are excluded as substrate, wherein the flake-form substrate is a glass flake, $SiO_2$ flake, $Al_2O_3$ flake, synthetic or natural flake-form iron oxide, synthetic or natural graphite and/or a flake-form metal, wherein the anion-binding layer comprises a layered double hydroxide of formula

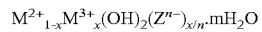

$$M^{2+}_{1-x}M^{3+}_x(OH)_2(Z^{n-})_{x/n} \cdot mH_2O$$

wherein $0.2 < x < 0.33$, $M^{3+}$ is $Al^{3+}$, $Cr^{3+}$, $Fe^{3+}$, $Ga^{3+}$, $In^{3+}$, $Y^{3+}$, $La^{3+}$ and/or $Ce^{3+}$, $M^{2+}$ is $Ba^{2+}$, $Ca^{2+}$, $Cu^{2+}$, $Mg^{2+}$, $Sr^{2+}$ and/or $Zn^{2+}$, Z is a counterion of a metal salt and/or an anion or anion mixture of an anion-forming organic, inorganic and/or organometallic colorant, n is the charge number of Z, and m is a stoichiometric factor and indicates the content of water of crystallisation, and wherein the anion-forming organic and/or inorganic colorant is in a proportion of 0.01 to 30% by weight based on the pigment as a whole.

2. A pigment according to claim 1, wherein the anion-binding layer comprises a layered double hydroxide.

3. A pigment according to claim 1, wherein one or more transparent, semitransparent and/or opaque layers of metal oxides, metal oxide hydrates, metal suboxides, metals, metal fluorides, metal nitrides, metal oxynitrides or mixtures thereof have been applied to the flake-form substrate beneath the anion-binding layer or on top of the anion-binding layer.

4. A pigment according to claim 1, wherein the flake-form substrate comprises a glass flake which has been coated with a layer of $SiO_2$ having a layer thickness of 5-350 nm.

5. A pigment according to claim 1, wherein the flake-form substrate has been doped with ions or elements.

6. A pigment according to claim 1, wherein the anion-binding layer comprises a layered double hydroxide of $Mg_{0.67}Fe_{0.33}(OH)_2(Z^{n-})_{0.33/n} \cdot mH_2O$, $Ca_{0.67}Al_{0.33}(OH)_2(Z^{n-})_{0.33/n} \cdot mH_2O$, $Zn_{0.67}Fe_{0.33}(OH)_2(Z^{n-})_{0.33/n} \cdot mH_2O$, or $Ca_{0.67}Fe_{0.33}(OH)_2(Z^{n-})_{0.33/n} \cdot mH_2O$.

7. A pigment according to claim 1, wherein $M^{3+}$ is $Al^{3+}$ or $Fe^{3+}$ and $M^{2+}$ is $Mg^{2+}$, $Ca^{2+}$ or $Zn^{2+}$.

8. A pigment according to claim 1, wherein the anion-binding layer has a layer thickness of 0.5-500 nm.

9. A pigment according to claim 1, wherein a stabilising inorganic and/or organic coating has additionally been applied to the pigment.

10. A cosmetic composition, paint, coating, plastic, film, security printing, security feature in a document or identity card, a coloring seed, food coloring a medicament coating, pigment composition, or dry preparation comprising a pigment according to claim 1.

11. A cosmetic composition, paint, coating, plastic, film, security printing, security feature in a document or identity card, a coloring seed, food coloring a medicament coating, pigment composition, or dry preparation comprising a mixture of a pigment according to claim 1 and an organic and/or inorganic dye and/or pigment other than the pigment according to claim 1.

12. A pigment according to claim 6, wherein m is 1 to 12.

13. A pigment according to claim 1, wherein the flake-form substrate is a $SiO_2$ flake or $Al_2O_3$ flake.

14. A pigment according to claim 1, wherein the flake-form sub-strate is a $SiO_2$ flake, $Al_2O_3$ flake, synthetic or natural flake-form iron oxide, synthetic or natural graphite and/or a flake-form metal.

15. A process for preparing a pigment according to claim 1, comprising stirring a suspension of flake-form substrate, metal cation salt, colorant salt and lye and/or lye precursor at a temperature of 10-120° C. in a solvent or solvent mixture so that an anion-binding layer forms on the substrate, where the anion-binding layer comprises an anion-forming organic, inorganic and/or organometallic colorant, the product is subsequently separated off, washed, dried and optionally sieved.

16. A process according to claim 15, wherein a solution of metal cation salt is added to a suspension of flake-form substrate, colorant salt and lye and/or lye precursor.

17. A process for preparing a pigment according to claim 1, comprising stirring a suspension of flake-form substrate, metal cation salt and lye and/or lye precursor at a temperature of 10-120° C. in a solvent or solvent mixture so that an anion-binding layer forms on the substrate forming an intermediate, the intermediate is then separated off, washed, dried and optionally sieved, and the intermediate is subsequently added to a solution of anion-forming organic, inorganic and/or organometallic colorant with stirring to form a resultant product.

18. A process according to claim 17, wherein the resultant product is calcined at a temperature of 300-600° C. with an anion-binding layer formed on the substrate before addition to a solution of anion-forming organic and/or inorganic colorant.

19. A pigment comprising a flake-form substrate and an anion-binding layer which comprises an anion-forming organic, inorganic and/or organometallic colorant,
wherein natural and synthetic clay minerals are excluded as substrate.,
wherein the flake-form substrate is ECR glass; fraction: 10-100 μm, substrate thickness: 850 nm,
wherein the anion-binding layer comprises a layered double hydroxide of formula

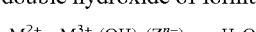

wherein
$0.2<x<0.33$,
$M^{3+}$ is $Al^{3+}$, $Cr^{3+}$, $Fe^{3+}$, $Ga^{3+}$, $In^{3+}$, $Y^{3+}$, $La^{3+}$ and/or $Ce^{3+}$,
$M^{2+}$ is $Ba^{2+}$, $Ca^{2+}$, $Cu^{2+}$, $Mg^{2+}$, $Sr^{2+}$ and/or $Zn^{2+}$,
Z is a counterion of a metal salt and/or an anion or anion mixture of an anion-forming organic, inorganic and/or organometallic colorant,
n is the charge number of Z, and
m is a stoichiometric factor and indicates the content of water of crystallisation, and
wherein the anion-forming organic and/or inorganic colorant is in a proportion of 0.01 to 30% by weight based on the pigment as a whole.

20. A pigment comprising a flake-form substrate and an anion-binding layer which comprises an anion-forming organic, inorganic and/or organometallic colorant,
wherein natural and synthetic clay minerals are excluded as substrate,
wherein the flake-form substrate is a glass flake, $SiO_2$ flake, $Al_2O_3$ flake, synthetic or natural flake-form iron oxide, synthetic or natural graphite and/or a flake-form metal,
wherein the anion-binding layer comprises a layered double hydroxide of formula

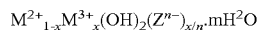

wherein
$0.2<x<0.33$,
$M^{3+}$ is $Al^{3+}$, $Cr^{3+}$, $Fe^{3+}$, $Ga^{3+}$, $In^{3+}$, $Y^{3+}$, $La^{3+}$ and/or $Ce^{3+}$,
$M^{2+}$ is $Ba^{2+}$, $Ca^{2+}$, $Cu^{2+}$, $Mg^{2+}$, $Sr^{2+}$ and/or $Zn^{2+}$,
Z is a counterion of a metal salt and/or an anion or anion mixture of an anion-forming organic, inorganic and/or organometallic colorant,
n is the charge number of Z, and
m is a stoichiometric factor and indicates the content of water of crystallisation, and
wherein the anion-forming organic and/or inorganic colorant is in a proportion of 0.5 to 10% by weight based on the pigment as a whole.

21. A pigment according to claim 20, wherein the flake-form sub-strate is a flake-form metal or ECR glass; fraction: 10-100 μm, substrate thickness: 850 nm.

22. A pigment comprising a flake-form substrate and an anion-binding layer which comprises an anion-forming organic, inorganic and/or organometallic colorant,
wherein natural and synthetic clay minerals are excluded as substrate,
wherein the flake-form substrate is a flake-form metal,
wherein the anion-binding layer comprises a layered double hydroxide of formula

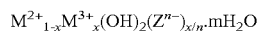

wherein
$0.2<x<0.33$,
$M^{3+}$ is $Al^{3+}$, $Cr^{3+}$, $Fe^{3+}$, $Ga^{3+}$, $In^{3+}$, $Y^{3+}$, $La^{3+}$ and/or $Ce^{3+}$,
$M^{2+}$ is $Ba^{2+}$, $Ca^{2+}$, $Cu^{2+}$, $Mg^{2+}$, $Sr^{2+}$ and/or $Zn^2$,
Z is a counterion of a metal salt and/or an anion or anion mixture of an anion-forming organic, inorganic and/or organometallic colorant,
n is the charge number of Z, and
m is a stoichiometric factor and indicates the content of water of crystallisation, and
wherein the anion-forming organic and/or inorganic colorant is in a proportion of 0.01 to 30% by weight based on the pigment as a whole.

* * * * *